United States Patent Office 2,807,387
Patented Sept. 24, 1957

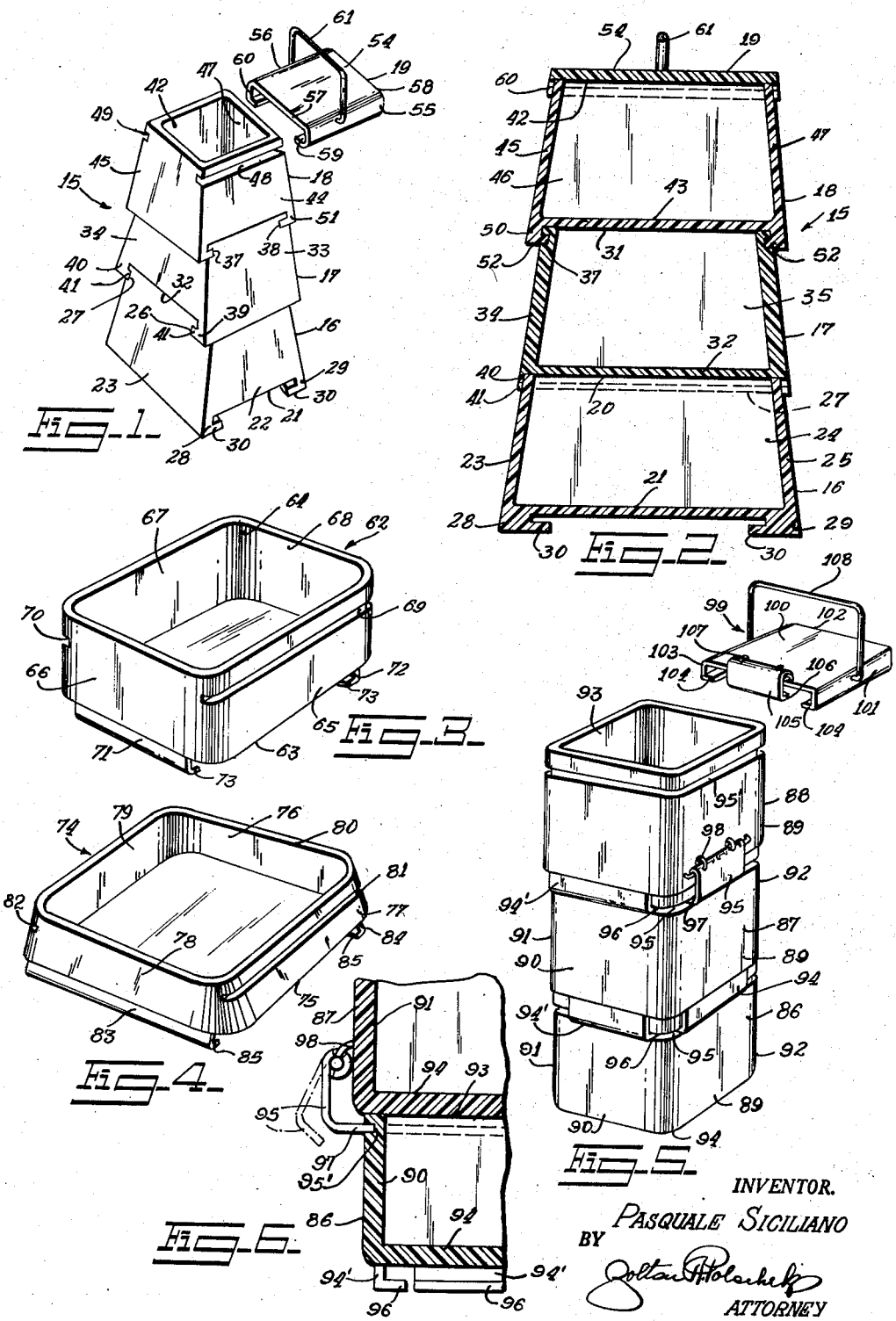

2,807,387
STACKABLE CONTAINERS

Pasquale Siciliano, New York, N. Y.

Application January 21, 1954, Serial No. 405,335

2 Claims. (Cl. 220—4)

This invention relates to new and useful improvements in storing, carrying and serving devices for food or any other product or article.

More particularly, the present invention proposes the construction of improved complementary interlocking food containers having interlocking receptacles which can be used to store, transport and serve food conveniently and compactly and substantially in the same condition as that at the time it was prepared.

Another object of the present invention proposes forming receptacles with groove and flange structure adapted for use in the form of trays, plates or other dishes as well as pots and pans in which food can be cooked, chilled or otherwise prepared.

Still further, the present invention proposes constructing the interlocking receptacles generally similar with one receptacle adapted removably to be fastened over another to serve as a lid or cover for it.

As a further object, the present invention proposes forming a lid with flange structure similar to that of the receptacles to fit the receptacle grooves on any receptacle so that any number of receptacles can be used together as needed or desired with the top one covered by the lid.

The present invention further proposes constructing the receptacles with grooves on four sides and dependent fixed flanges on three sides and a movable flange pivotally secured to the fourth side with means to bias the movable flange in the same position as the fixed flanges so that one receptacle can be securely but removably fastened to another in stacked relation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of interlocking food containers constructed and arranged in accordance with the present invention.

Fig. 2 is a vertical sectional view of the structure shown in Fig. 1.

Fig. 3 is a perspective view of a single receptacle illustrating a modification of the invention.

Fig. 4 is a view similar to Fig. 3 but illustrating another modification.

Fig. 5 is a view similar to Fig. 1 but illustrating still another modification of the present invention.

Fig. 6 is a fragmentary vertical sectional view of the structure shown in Fig. 5.

The complementary interlocking food containers, in accordance with the first form of the invention illustrated in Figs. 1 and 2, are generally collectively designated by the reference character 15. In this form, a plurality of separate receptacles 16, 17 and 18 are provided as well as a lid 19. The receptacles 16, 17 and 18 are generally similar in construction.

Receptacle 16 has an open top 20 and closed bottom 21 and sides 22, 23, 24, 25. The four sides are tapered or sloped so that the bottom 21 is greater in area than the top 20. Grooves 26 and 27 are formed in the opposed sides 22 and 24, respectively, the grooves being disposed adjacent the top 20 and parallel thereto.

Extending from opposed sides 23 and 25, respectively, of receptacle 16 are fixed bottom angle extensions 28 and 29. These extensions have opposed bottom legs 30 disposed parallel to the bottom 21 of receptacle 16 and of the same thickness as the width of the grooves 26 and 27.

Receptacle 17 has an open top 31 and closed bottom 32 and four sloping sides 33, 34, 35 and 36. Grooves 37 and 38 are formed in the opposed sides 33 and 35, respectively, similar to and similarly placed as the grooves 26 and 27 in receptacle 16. Receptacle 17 has bottom angle extensions 39 and 40 extending from its opposed sides 34 and 36. These extensions 39 and 40 have bottom legs 41 parallel to the bottom 32 of the receptacle 17 and of a size and shape frictionally to fit slidably and removably in the grooves 26 and 27 of receptacle 16. The extensions 39 and 40 and their legs 41 are made so that when the legs 41 are in grooves 26 and 27, the bottom 32 of receptacle 17 covers the open top 20 of receptacle 16 completely as a lid. This prevents anything falling into the receptacle 16 as well as retaining heat in the receptacle 16 or retarding the flow of heat into the receptacle.

The third receptacle 18 has an open top 42, closed bottom 43 and sloping sides 44, 45, 46 and 47 with grooves 48 and 49 and bottom angle extensions 50 and 51 having bottom legs 52.

The lid 19 is provided to cover the open top of the upper receptacle 18 (as shown in the illustration of Figs. 1 and 2). Lid 19 has a flat top 54 and four sides 55, 56, 57 and 58. Sides 55 and 56 have flange extensions 59 and 60 like the bottom legs 30, 41 and 52 of bottom angle extensions 28, 29, 39, 40 and 50, 51, on receptacles 16, 17 and 18. The flange extensions 59 and 60 are disposed parallel to the flat top 54 of lid 53 and are adapted frictionally and slidably to fit in grooves 48 and 49 of receptacle 18 and in grooves 26, 27 and 37, 38 of the other two receptacles. A handle 61 is pivotally secured to the lid 53 for carrying the stacked interlocked receptacles.

The modified form of the invention illustrated in Fig. 3 is characterized by the provision of a receptacle 62 similar to receptacles 16, 17 and 18 illustrated in Figs. 1 and 2 and described above but in the form of a serving dish rather than a pail or pot. The receptacle 62 has a closed bottom 63, and open top 64 and four sides 65, 66, 67 and 68. Sides 65 and 67 contain grooves 69 and 70 and sides 66 and 68 have bottom angle extensions 71 and 72 having opposed bottom legs 73.

The modification illustrated in Fig. 4 is similar to that shown in Fig. 3 and described above except that a receptacle 74 is provided in the form of a shallow dish or plate. This receptacle 74 has a closed bottom 75, open top 76, and sides 77, 78, 79 and 80. Sides 77 and 79 contain grooves 81 and 82 and sides 78 and 80 have bottom angle extensions 83 and 84 having opposed bottom legs 85.

The modification of the present invention illustrated in Figs. 5 and 6 is characterized by the provision of receptacles 86, 87 and 88 each similarly or identically constructed with sides 89, 90, 91 and 92 and an open top 93 and closed bottom 94. A continuous groove 95 is provided in the sides 89, 90, 91 and 92 adjacent the open top 93 and parallel thereto. Fixed bottom angle extensions 94' are provided on sides 89, 90 and 91 and a movable bottom angle extension 95 is pivotally mounted on side 89. Extensions 94' and 95 have inwardly facing bottom legs 96 and 97, respectively, adapted frictionally to fit into the groove or grooves 95' of other ones of the receptacles. A spring 98 provides resilient means to bias the movable extension 95 so that its leg 97 is seated in the groove or grooves. In this manner, the receptacles 86, 87 and 88 can be removably locked together in stacked form with the bottom of one container covering the top of another. A lid 99 is provided to cover the top of the uppermost container. Lid 99 has a flat top 100 and dependent sides 101, 102 and 103. Fixed flange extensions 104 are formed on sides 101, 102 and 103 and a movable side 105 with flange extension 106 is pivotally mounted on the lid with a spring 107 to hold it in place. A handle 108 is pivotally secured to the lid 99.

It is to be understood that although the flanges and grooves are illustrated as being on different sides of the receptacles, if desired or expedient, they may be placed parallelly on the same side of the receptacle, one above the other.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A stacked container assembly comprising a bottom four-sided receptacle having an open top and closed bottom, outer communicating grooves on said sides adjacent said open top and parallel thereto, an upper four-sided receptacle having an open top and closed bottom, said upper receptacle having fixed bottom angle extensions on three of its sides and a movable bottom angle extension pivotally mounted on the fourth side, said extensions having inwardly facing bottom legs parallel to the bottom of said upper receptacle and fitting said grooves in the sides of the bottom receptacle removably to lock the two receptacles together with the bottom of the upper receptacle covering the top of the bottom receptacle, and a spring pivotally secured to said upper receptacle and to said movable extension, said movable extension having a bottom leg seated in the groove in the remaining side of said bottom receptacle.

2. A stacked container assembly comprising a lower receptacle and an upper receptacle, each of said receptacles having four sides, an open top and a closed bottom, said sides having a continuous groove therearound adjacent the open top and parallel thereto, said upper receptacle having fixed bottom angle extensions on three of its sides and a bottom angle extension pivotally mounted on the fourth side thereof, said extensions having inwardly facing bottom legs parallel to the bottom of said upper receptacle, and fittingly mounted in the continuous groove in the bottom receptacle for detachably interlocking the receptacles together with the bottom of the upper receptacle covering the open top of the bottom receptacle, a spring mounted on the upper receptacle and impinging against the pivoted angle extension for urging said extension into the groove, and a removable lid on the open top of said upper receptacle, said lid having three sides with inwardly extending fixed flange extensions and a fourth side with a spring-pressed pivoted flange extension, said lid extensions being adapted to seat in the continuous groove in the upper receptacle, and a handle secured to said lid.

References Cited in the file of this patent

UNITED STATES PATENTS

| | | |
|---|---|---|
| 188,566 | Barnes | Mar. 20, 1877 |
| 460,748 | Hartmann | Oct. 6, 1891 |
| 509,839 | Bowley | Nov. 28, 1893 |
| 713,655 | Lawson | Nov. 18, 1902 |
| 831,476 | Ryan | Sept. 18, 1906 |
| 1,538,473 | Cross | May 19, 1925 |
| 1,976,622 | McIntyre | Oct. 9, 1934 |
| 2,019,722 | Neumeyer | Nov. 5, 1935 |
| 2,135,401 | Kiff | Nov. 1, 1938 |
| 2,180,229 | Frakes | Nov. 14, 1939 |
| 2,454,438 | Falk et al. | Nov. 23, 1948 |

FOREIGN PATENTS

| | | |
|---|---|---|
| 272,310 | Italy | Mar. 6, 1930 |